April 16, 1968 P. S. MITTELMAN 3,378,447
REACTOR SYSTEM FOR GAMMA IRRADIATION
Filed Feb. 9, 1966 2 Sheets-Sheet 1
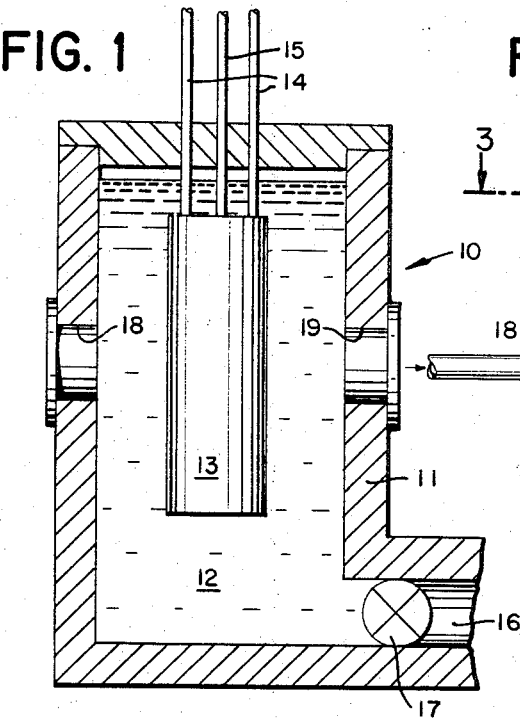
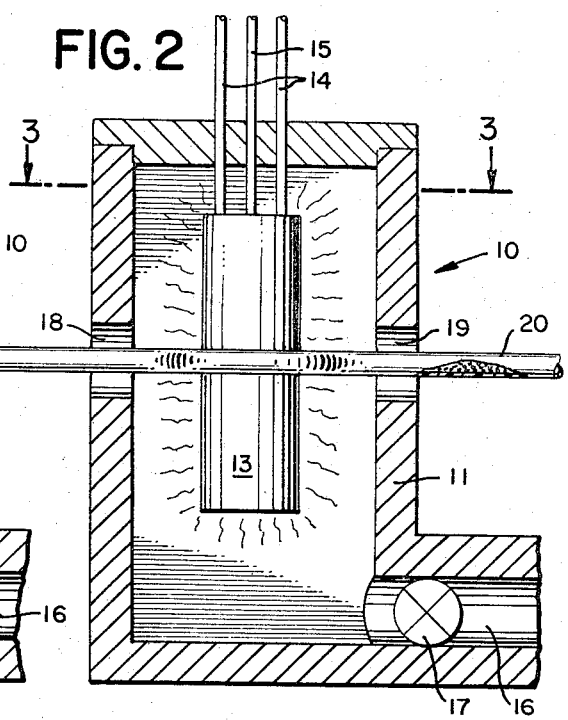
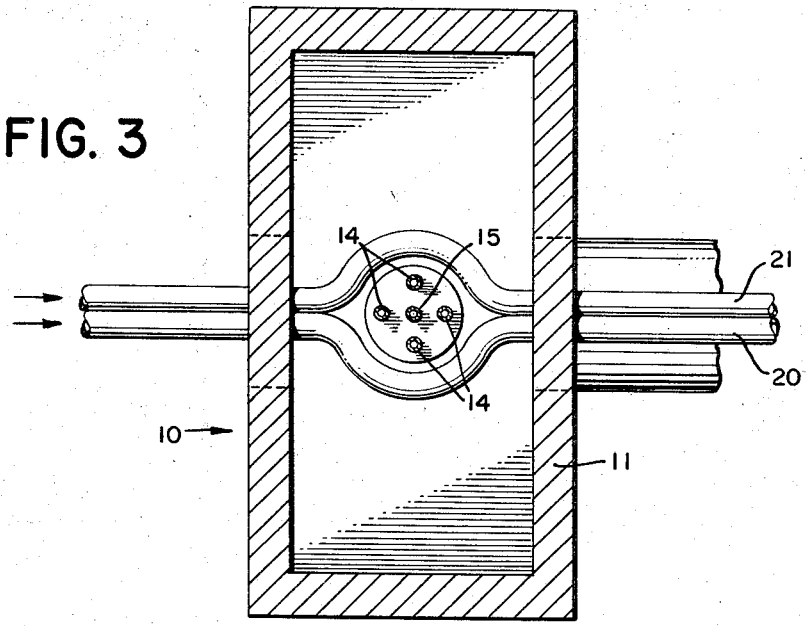
INVENTOR.
PHILLIP S. MITTELMAN
BY
Pennie, Edmonds, Morton, Taylor + Adams
ATTORNEYS April 16, 1968 P. S. MITTELMAN 3,378,447
REACTOR SYSTEM FOR GAMMA IRRADIATION
Filed Feb. 9, 1966 2 Sheets-Sheet 2

INVENTOR.
PHILLIP S. MITTELMAN
BY
Pennie, Edmonds, Morton, Taylor & Adams
ATTORNEYS

United States Patent Office 3,378,447
Patented Apr. 16, 1968

3,378,447
REACTOR SYSTEM FOR GAMMA IRRADIATION
Phillip S. Mittelman, Armonk, N.Y., assignor to United Nuclear Corporation, White Plains, N.Y., a corporation of Delaware
Filed Feb. 9, 1966, Ser. No. 526,222
9 Claims. (Cl. 176—12)

This invention relates to a method for utilizing a nuclear reactor as a gamma irradiator for selected materials, for example foodstuff.

Food preservation by gamma irradiation has been proven to be feasible and certain foods, such as irradiated fresh bacon, have been cleared by the Food and Drug Administration for public consumption. Heretofore, the primary gamma sources were the long half-life radioisotopes, i.e., $Co^{60}$ and $Cs^{137}$, spent nuclear fuel elements, and fission gases. These materials are the by-products of nuclear reactors. Their utilization as gamma sources involves complex chemical operations for the recovery of isotopes or intricate handling problems for the spent fuel elements and fission gases. Direct use of a nuclear reactor has been considered to be undesirable for the food irradiation process because the associated neutron radiation usually causes neutron actuation of the foodstuff beyond the maximum permissible level. Irradiation of foodstuff during the shutdown period of a nuclear reactor has the problem caused by fast falloff of the gamma radiation intensity which sometimes can be by a factor as large as 30. With this falloff, exposure times which would be in the order of 10–20 minutes at the beginning of the irradiation period are lengthened to 5–10 hours near the end of the period.

I have now found that these prior disadvantages can be completely overcome by the method of the present invention which, broadly stated, comprises placing in, or adjacent to, the reactor core of the nuclear reactor a gamma ray emitting material or a parent isotope capable of providing a gamma emitting daughter when subjected to neutron irradiation. The reactor is then operated cyclically to provide alternate periods of operation and shutdown of which the shutdown periods are used for irradiation and the operation period for buildup of gamma emitting isotopes. The reactor is allowed to operate initially for a sufficient length of time to allow the reactor to build up a predetermined inventory of gamma emitting fission products. The selected material for irradiation is then introduced into the reactor during each shutdown period for gamma iradiation. The irradiated material is subsequently withdrawn from the reactor in the same shutdown period after it has received a predetermined dosage of gamma radiation.

The placement of gamma ray emitting materials or parent isotopes capable of emitting daughters upon neutron irradiation in the reactor core, or its proximity, substantially lowers the falloffs and decreases the required exposure time. Advantageously, parent isotopes are used in the core whereby radioactive daughters are generated during the operating cycle of the reactor and said daughters emit decay gamma during the irradiation period. I found that the amount of parent isotopes added should be sufficient to cause a change in reactivity greater than 30% in order for the daughter activity to contribute between 13% to 70% of the total activity. In addition, the parent isotopes should yield daughters with half-life preferably longer than about 60 days The long half-life is required to achieve a low falloff in total activity during the irradiation period.

Various types of nuclear reactors may be used in accordance with the method of this invention provided that they are capable of being operated cyclically and that the material to be irradiated can be transported through or to the vicinity of the reactor core during the shutdown period. I found a swimming pool type of reactor is particularly suitable as a gamma irradiator. A typical cyclic operation of the swimming pool reactor consists of the following steps:

(1) Filling the pool with water;
(2) Operating the reactor for a predetermined period;
(3) Shutting down the reactor and draining the water from the pool;
(4) Irradiating the selected materials by passing them near or through the core;
(5) After the prescribed irradiation (shutdown) period, returning to step 1.

Generally, the operating period should be sufficiently long in order to rebuild the fission product activity to a predetermined level. Similarly, the shutdown period should be long enough to allow an economical throughput of irradiation material and to minimize the time required for the reactor operation.

The reactor core may be in the form of a single unit or it may be in the form of a split core. In the former case, conveyors may be used to carry the irradiation material past the side and/or the bottom of the core, and in the latter case, the core may be opened to allow the foodstuff to pass therebetween. The latter arrangement will insure a subcritical system at all times during irradiation periods, and the split core geometry enables the irradiation materials to pass closer to the core thus providing a higher dose rate.

Further to illustrate this invention specific embodiments are described hereinbelow with reference to the accompanying drawings wherein:

FIG. 1 is a side elevation of a swimming pool nuclear reactor in the normal operating period;

FIG. 2 is a side elevation of the same reactor in the irradiation period;

FIG. 3 is the cross section of FIG. 2 taken along line 3—3;

Figure 4:
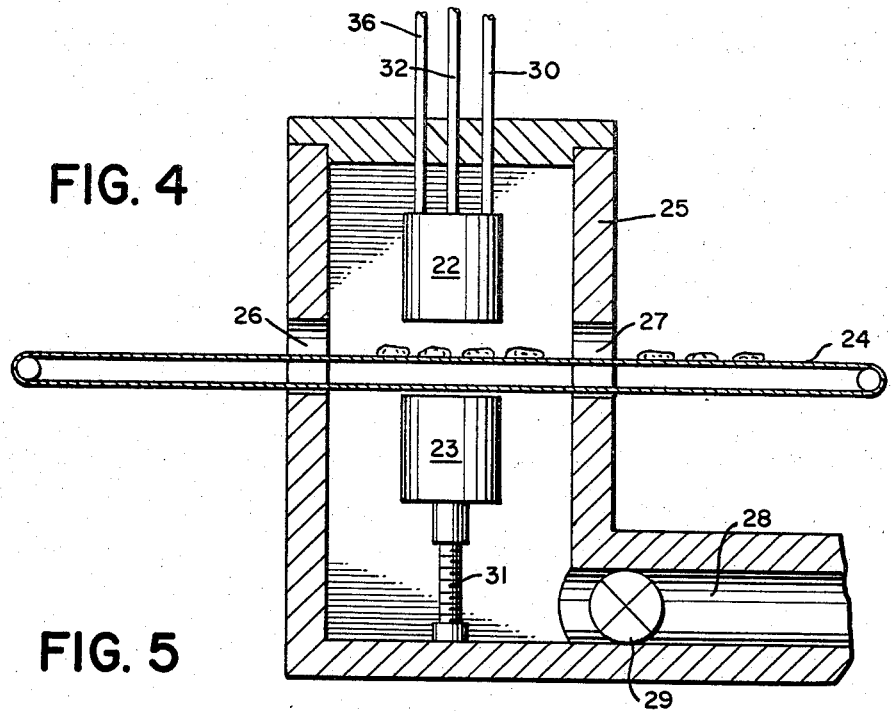
FIG. 4 is a side elevation of a second embodiment of this invention showing a swimming pool type of reactor with a split core geometry during the irradiation period.

Referring initially to FIG. 1, the swimming pool type of reactor 10 consists of a concrete tank 11 filled with water 12. In the pool of water, there is suspended a reactor core 13 by suspension rods 14. The operation of the reactor core 13 is controlled by the control rod 15. To insure the quick removal and filling of the reactor with water, the tank 11 preferably is equipped with a large conduit 16 controlled by a valve 17. Two diametrically disposed openings 18 and 19 are provided at the sides of the tank 11 to provide access to the reactor core during the shutdown period for the irradiation purpose as will be apparent from the subsequent description.

After the reactor has been operated initially for a period sufficiently long to build up stable gamma emitting radioisotopes, e.g. ~40 days, the reactor is shutdown by the control rod 15, and the water in the pool is quickly removed by opening the valve 17 letting the water to flow out of conduit 16. Conveying means, such as tubes 20 and 21 are inserted adjacent to the core 13 and pass therethrough from opening 18 to opening 19, as illustrated in FIGS. 2 and 3. The material to be irradiated is then passed adjacent to and through the reactor core for irradiation. When tubes are used as the conveyor means, granulated materials such as wheat and rice may be conveniently transported therethrough by fluidization for irradiation. Several conveyors may be used simultaneously. Preferably, they are arranged in a manner as to surround the full length and the bottom of the core for economic utilization of the gamma radiation. Other arrangements such as using a tube helically surrounding the reactor core may also be used to provide the necessary exposure for maximum throughput. The number of conveyors and their speeds for transporting the irradiation materials through the core, the irradiation zone, advantageously are optimailzed to provide the required radiation dosage to the material.

In a second preferred embodiment, as illustrated in FIG. 4, the reactor core may be divided into two separate sections, for example, a top and bottom section. In this arrangement, the top section 22 and the bottom section 23 of the reactor core may be separated during the shutdown period to provide a gap for the conveyor 24 to pass therebetween. The tank 25 that houses the split core is provided with openings 26 and 27 in its opposite sides to allow the conveyor 24 to go through. Similar to the first embodiment illustrated in FIG. 1, the tank may be provided with water conduit 28 controlled by valve 29 for the rapid draining and refilling of the tank 25 during the cyclic operation of the reactor.

In the split core arrangement, the upper section 22 of the core may house all the control mechanism and is held stationary in the tank 25 by the suspension rods 30. The lower portion 23 of the reactor core may be made movable by a hydraulic lift 31, which is used during the shutdown period to separate the core. During the operational period, the reactor is controlled by the control rod 32 disposed at the upper section 22 of the core.

Figure 5:
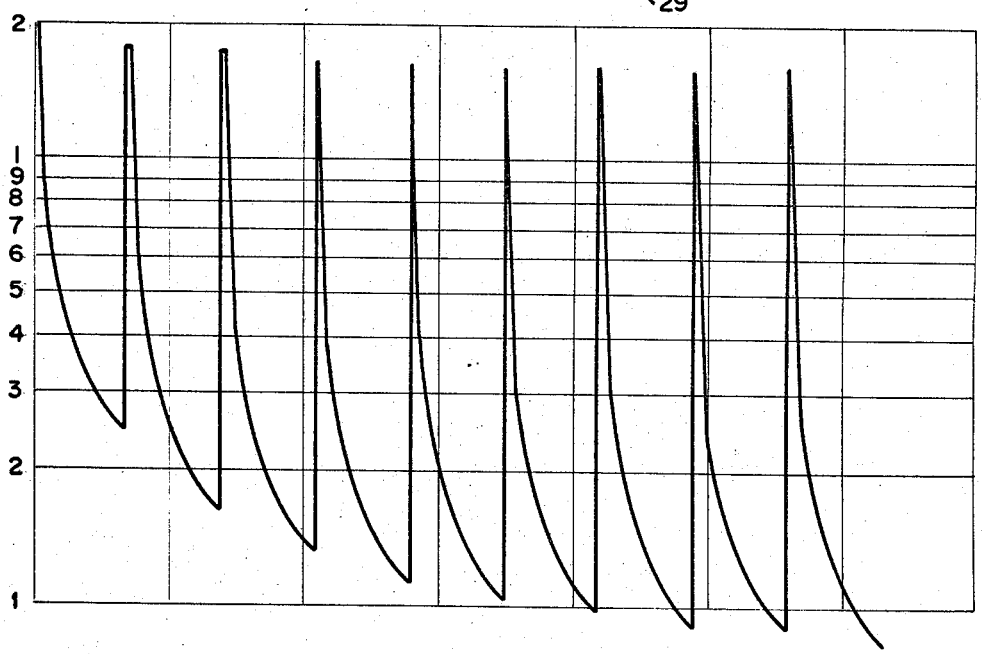
FIG. 5 is a graph showing a typical dose rate fluctuation during the cyclic operation of the reactor.

In both arrangements, described hereinabove, the cyclic operation of the reactor provides a fluctuating gamma dosage to the irradiation materials as shown in FIG. 5 in which the axis of the abscissa represents the time, and the axis of the ordinates the gamma dose rate. Each peak represents the initial dose rate immediately after shutdown of the reactor, although it should be understood that the fluctuations vary with different types of reactors and particularly with the amount of parent isotopes added to the core. The falloff of the gamma activity during each irradiation cycle may be compensated by variation of the irradiation time for the material, such as by gradually lowering the speed of the conveyor during the irradiation period. For most food material for which a dosage of 10 to 50K rep is sufficient, the reactor that may be used should have sufficient gamma radiation intensity so as to provide an irradiation period for the material in the order of 5–20 minutes.

Of the two types of reactor core described, the split core appears to have a more favorable geometry from the standpoint that it will provide a shorter irradiation time. Using this geometry has the further advantage that the dosage for the irradiation material may be controlled by varying the width of the gap between the split core. It is understood by those skilled in the art that the core may also be divided by splitting the cylinder core vertically instead of horizontally as shown. It may also be advantageous to use more than one reactor in the irradiation plant so that continuous operation for irradiation material may be insured.

A typical swimming pool reactor, that may be employed for the process of this invention, may be considered as a non-enclosed assembly of MTR fuel elements immersed in a pool of water. The fuel elements, which are arranged on a square pitch, contain 140 grams of $U^{235}$ in the form of aluminum clad plates of alloyed highly enriched uranium and aluminum. Critical masses usually range from ~2.4–3.7 $KgU^{235}$, although the grid will accommodate up to 54 fuel elements. Control is normally effected by two boron carbide-lead shim safety rods each equivalent to between 2.5–3.8 percent $\Delta K/K$. The normal operating level is approximately 100 kw. although operation at 1000 kw. may be accomplished with only natural convection cooling by the pool water. The core may have a maximum dimension of 28 inches by 19 inches by 24 inches, the latter dimension being the active fuel length. It is understood that the present drawings accompanying the specification are schematic drawings and do not represent the proportions of an actual swimming pool reactor. The core shown in the drawings is also cylindricized for the purpose of illustration.

The core cylindricizing facilitates the determination of the dose rate at various detector points by standard calculation techniques for the unshielded core. In such computation, the core may be considered to be a cylinder 15 inches in radius and 24 inches in height. In the calculations used for illustration hereinbelow, the decay gamma emission rate from the fission product for decay times greater than 10 seconds may be described as:

$$N\gamma(t) = 1.3 t^{-1.2}$$

where $t$ = time after fission event (seconds)
$N\gamma(t)$ = fission product decay gamma emission rate (mev./sec. fission) at time $t$ when applied to a reactor operated cyclically, this equation yields:

$$\frac{P\gamma}{\alpha P_R} = \sum_{n=1}^{N} \{[t+(n-1)T_c]^{-.2} - [t+(n-1)T_c+T_o]^{-.2}\} \frac{\text{mev.}}{\text{sec.-watt}}$$

where $n$ = total number of cycles
$T_c = T_0 + t_{max}$ = cycle time from start-up to start-up (sec.)
$T_0$ = time during which the reactor is operating (sec.)
$t$ = decay time (sec.)
$P\gamma$ = fission product decay gamma emission rate (mev./sec.)
$\alpha = 2 \times 10^{11}$
$P_R$ = reactor power (watts) during operation The gamma activity contributed by the supplemental isotopic gamma source subjected to cyclic irradiation and undergoing a single decay transition is:

$$An(t) = \lambda \left[ \frac{\Sigma_1 \varphi}{\sigma \varphi + \lambda} \right]$$

$$\frac{\{1 - \exp[-\sigma\varphi + \lambda)T_o]\}\{1 - \exp[-(n+1)(\sigma\varphi T_o + T_o)]e^{-\lambda t}\}}{\{1 - \exp[-(\sigma\varphi T_o + \lambda T_o)]\}} \frac{\text{dps}}{\text{cm.}^3}$$

where:
$\Sigma_1$ = macroscopic acivation-cross section for the parent nuclide (cm.$^{-1}$)
$\varphi$ = neutron flux the parent nuclide is subjected to (neutrons/cm.$^2$-sec.)
$\lambda$ = decay constant of the daughter (sec.$^{-1}$)
$\sigma$ = microscopic absorption cross section for the daughter (cm.$^2$)
$T_c$ = cycle time (sec.)
$T_0$ = reactor operating time (sec.)
$t$ = time after shutdown (sec.)
$n$ = number of cycles This expression can be simplified if $$\sigma\varphi \measuredangle \measuredangle \lambda \text{ and } T_0 \leq T_c, \text{ yielding}$$

$$A_r(t) = (\Sigma_1 \varphi \frac{[1-\exp(-\lambda T_o)]\{1-\exp[-(n+1)\lambda T_c]\}e^{-\lambda t}}{[1-\exp(-\lambda T_c)]} \frac{\text{dps}}{\text{cm.}^3}$$

Ideally, the isotopic gamma source that may be employed should have an activity level that would increase with decay time to offset the falloff in fission product activity. For illustrative purposes, suitable isotopes which have a single daughter include $Sb^{121}$, $Sb^{123}$, $Dy^{164}$, $Lu^{176}$, and $Au^{197}$, of which I found $Lu^{176}$ and $Dy^{164}$ to be particularly suitable. Their typical nuclear properties are listed in Table 1 hereinbelow:

TABLE 1.—SUPPLEMENTARY ISOTOPIC GAMMA SOURCES

| Parent Isotope | Natural Abundance (Percent) | 2,200 m./sec. Activation Cross Section (barns) | Density (g./cc.) | Daughter Isotope | Daughter Half Life |
|---|---|---|---|---|---|
| $_{51}Sb^{121}$ | 57 | 5.9 | 6.7 | $Sb^{122}$ | 2.8 d. |
| $_{51}Sb^{123}$ | 43 | 4.1 | 6.7 | $Sb^{124}$ | 60 d. |
| $_{66}Dy^{164}$ | 28.2 | ~3,600 | ~8.5 | $Dy^{165}$ | 81 h.* |
| $_{71}Lu^{176}$ | 2.60 | ~4,000 | ~9.8 | $Lu^{177}$ | 6.7 d. |
| $_{79}Au^{197}$ | 100 | 96 | 19.3 | $Au^{198}$ | 2.7 d. |

* $Dy^{165}$ has a thermal absorption cross section of 5,000 b. However, its decay is predominantly made of destruction since $\lambda = 5 \times 10^{-9}$ sec.$^{-1}$ and $\sigma\varphi \cong 2.38 \times 10^{-6}$ sec.$^{-1}$.

By seeding the reactor core with varying amounts of the parent isotopes will cause a variation in the falloff of total activity and consequently total dose rate. For specific examples, using a swimming pool reactor operating at 100 kw. and having a core-average flux of $$10^{12} \frac{\text{neutrons}}{\text{cm.}^2\text{-sec.}}$$

in which the core is seeded in each example with an isotope listed in Table 1 and that the contribution of fission product activity to total activity fifteen minutes after shutdown is 25%, the falloff in total activities during the irradiation period of these examples is tabulated in Table 2. In all the examples, a cycle time of 7 days is used in which period one day is used for operating the reactor. The calculations are made based on the equations stated hereinabove.

TABLE 2

| Parent Isotope | Kg. of Parent to Contribute 75% to the Total Activity at 900 Seconds | Falloff in Total Activity During Irradiation Period |
|---|---|---|
| $Dy^{164}$ | 27 | 5.9 |
| $Lu^{176}$ | 380 | 2.5 |
| $Au^{197}$ | 332 | 5.7 |
| Sb | 4,650 | 3.03 |

By varying the amount of isotopic source, the total activity can be optimized. However, in optimizing, it is necessary to consider the cost of the isotope used and the amount of isotope required to obtain the desired results. Thus, in order to select a suitable isotope, it is necessary to consider:

(1) The amount of isotope to be used,
(2) The effect of this isotope on the reactor's reactivity and amount of additional fuel necessary to compensate for the presence of the isotope;
(3) the cost of the isotope; and
(4) the effect of the isotope on total activity falloff.

In accordance with this invention, it can be shown that by using a parent isotope that yields a daughter with a half life about 60 days, the total dose rate falloff may be minimized to a factor of less than about 3, using a 100 kw. swimming pool reactor as described above, in a 7-day cycle with one of the days used for operating the reactor. The amount of the parent isotope used in such case may cause a 30% change in reactivity and the daughter's activity will be 37% of equilibrium. In this case, after 40 days of initial operation, the total dose rate will fall off from 0.297 r./hr. watt at one detecting point 15 minutes after shutdown to 0.1218 r./hr. watt 6 days later, a factor of 2.44. Then, when the reactor undergoes an infinite number of cycles during the irradiation period, the dose will fall off by a factor of 2.74. This increase in falloff results from the fact that the shutdown perior is longer than the operating period (6-day shutdown and 1-day operation). If the operating period is increased to 2 days, with cycle time remaining at 7 days, then, after an infinite number of cycles following the initial 40 days' operation, the falloff would be 2.34.

I claim:
1. A method for utilizing a nuclear reactor as a gamma ray irradiator for selective materials which comprises:
   (a) placing in, or adjacent to, the reactor core of said nuclear reactor a gamma ray emitting material or a parent isotope capable of yielding a gamma emitting daughter when subjected to neutron irradiation;
   (b) cyclically operating said reactor to provide alternating periods of operation and shutdown after an initial operating period of a sufficient length of time to build up a stable inventory of gamma emitting fission products;
   (c) introducing the selected material into the reactor during each of said shutdown periods for irradiation with gamma ray; and
   (d) withdrawing said material from the reactor in the same shutdown period after said material received a predetermined dosge of gamma ray.

2. A method for utilizing a nuclear reactor as a gamma ray irradiator for selective materials which comprises:
   (a) placing in, or adjacent to, the reactor core of said nuclear reactor at least one parent isotope capable of yielding a gamma emitting daughter upon neutron irradiation having a half life above about 60 days and the amount of said parent isotope in the reactor core being sufficient to yield said daughter having gamma activity equivalent to 13% to 70% of the total gamma activity of said reactor when it is used as an irradiator;
   (b) cyclically operating said reactor to provide alternating periods of operation and shutdown after an initial operation period for a sufficient length of time to build up a substantially stable inventory of gamma emitting fission products and to yield a sufficient amount of said daughter, the length of each shutdown period being sufficient to allow said inventory of fission products to decay to a predetermined gamma intensity, and each of said shutdown periods being longer than its subsequent operating period;
   (c) introducing said material into the reactor and adjacent to the reactor core during each of said shutdown periods for irradiation with gamma ray from said fission products and said gamma emitting daughter, and
   (d) withdrawing said material from the reactor within the same shutdown period after said material received a predetermined dosage of gamma ray.

3. A method according to claim 2 wherein said parent isotope is selected from a group consisting of $Sb^{121}$, $Sb^{123}$, $Dy^{164}$, $Lu^{176}$, and $Au^{197}$.

4. A method for utilizing a swimming pool type reactor as a gamma ray irradiator for selective materials, said reactor containing at least one reactor core in said pool which method comprises:
   (a) placing in, or adjacent to, said reactor core at least one parent isotope capable of yielding a long life gamma emitting daughter upon neutron irradiation having a half life above about 60 days and the amount of said parent isotope being sufficient to yield said daughter having gamma activity equivalent to 13% to 70% of the total gamma activity of the reactor when it is used as an irradiator;
   (b) cyclically operating said reactor to provide alternating periods of operation and shutdown after an initial operation period for a sufficient length of time to build up a stable inventory, the water being removed during said shutdown periods and refilled during said operation periods, said shutdown periods being sufficient to allow the fission product to decay to a predetermined level, and said operation periods being sufficient to regenerate the depleted fission products;
   (c) introducing said materials into the reactor and adjacent to said reactor core during each of said shutdown periods for irradiation with gamma ray from said fission products and said gamma emitting daughter; and (d) withdrawing said material from the reactor in the same shutdown period after said material received a predetermined dosage of gamma ray.

5. A method according to claim 4 in which the predetermined gamma dosage for said material is 10 to 50K rep and the irradiation period is approximately 5–20 minutes.

6. A method according to claim 4 in which the falloff of the total gamma activity is less than about 3.

7. A method for utilizing a nuclear reactor as a gamma ray irradiator for selective materials, said reactor having a nuclear core capable of separating into two portions which method comprises:

(a) placing a predetermined amount of a parent isotope in, or adjacent to, the reactor, said parent isotope being capable of yielding a gamma emitting daughter upon neutron irradiation, said daughter having a half life above about 60 days and having a gamma activity equivalent to 13% to 70% of the total gamma activity of the reactor;

(b) cyclically operating said reactor to provide alternating periods of operation and shutdown after the reactor is initially operating for a length of time to build up a stable inventory of gamma emitting fission products, the length of each shutdown period being sufficient to allow said inventory of fission products to decay to a predetermined gamma intensity, and the length of each operating period being sufficient to regenerate substantially said inventory of fission products, said core being split open during each shutdown period;

(c) introducing said material into the reactor between the two portions of said core for irradiation with gamma ray from said fission products and said gamma emitting daughter; and (d) withdrawing said material from the reactor in the same shutdown period after said material receives a predetermined dosage of gamma ray.

8. A method according to claim 7 in which the predetermined gamma dosage for said material is 10 to 5K rep and the irradiation period is approximately 5 to 20 minutes.

9. A method according to claim 7 in which the falloff of the total gamma activity is less than about 3.

References Cited

UNITED STATES PATENTS 2,982,710   5/1961   Leyse et al. _____ 176—12

FOREIGN PATENTS 886,089   1/1962   Great Britain.

L. DEWAYNE RUTLEDGE, *Primary Examiner.*

CARL D. QUARFORTH, *Examiner.*

H. E. BEHREND, *Assistant Examiner.*